United States Patent [19]

Geluk

[11] 3,996,420
[45] Dec. 7, 1976

[54] X-RAY EXAMINATION

[75] Inventor: Ronald Jan Geluk, Nootdorp, Netherlands

[73] Assignee: N.V. Optische Industrie de Oude Delft, Delft, Netherlands

[22] Filed: Oct. 10, 1974

[21] Appl. No.: 513,528

[30] Foreign Application Priority Data

Oct. 11, 1973 Netherlands ............. 7313999

[52] U.S. Cl. .................... 178/6.8; 178/DIG. 1; 178/DIG. 5
[51] Int. Cl.² ........................ H04N 7/18
[58] Field of Search ........... 178/6.8, DIG. 1, DIG. 5

[56] References Cited

UNITED STATES PATENTS

| | | | |
|---|---|---|---|
| 2,739,257 | 3/1956 | Sheldon | 178/DIG. 5 |
| 3,567,854 | 3/1971 | Tschantz | 178/DIG. 5 |
| 3,580,997 | 5/1971 | Webb | 178/6.8 |
| 3,602,641 | 8/1971 | Heise | 178/DIG. 5 |
| 3,745,245 | 7/1973 | Yunde | 178/6.8 |
| 3,758,723 | 9/1973 | Green | 178/6.8 |

FOREIGN PATENTS OR APPLICATIONS

| | | | |
|---|---|---|---|
| 1,268,661 | 5/1968 | Germany | 178/DIG. 5 |
| 1,962,330 | 6/1971 | Germany | 178/DIG. 5 |
| 1,907,702 | 10/1970 | Germany | 178/DIG. 5 |

*Primary Examiner*—Robert L. Griffin
*Assistant Examiner*—Michael A. Masinick

[57] ABSTRACT

A method and apparatus for X-ray examining organs and parts of the body of human beings and/or animals, wherein the X-ray image is reproduced by means of a television circuit on the viewing screen of a monitor. Photographs of the X-ray image are taken as a film disposed in front of the screen of the monitor is exposed to the monitor picture for a period of time including a plurality of image scan cycles. During this period of time the gain in the television circuit is varied in accordance with a time function such that the brightness of the monitor picture remains constant during this period.

10 Claims, 6 Drawing Figures

X-RAY EXAMINATION

The present invention relates to a method of X-ray examining organs and parts of the body of human beings and/or animals, in which the image of the examined organ or part formed on an X-ray screen is electro optically amplified and the resultant amplified image, on the one hand, is continuously reproduced on a monitor by means of a television circuit including a signal amplifier and, on the other hand, can be recorded by a photographic camera on a photosensitive film while the X-ray radiation level is instantaneously increased.

The present invention further relates to an apparatus for performing the above method, comprising a controllable X-ray source, a fluorescent screen for forming an X-ray image of an X-rayed organ or part of the body of a human being or animal, an electro optical image amplifier disposed behind this screen and including a flourescent anode screen for forming a picture of the X-ray image having increased brightness, a television circuit including a signal amplifier and a monitor for reproducing the X-ray image having increased brightness, and a photographic camera for taking instantaneous photographs of the X-ray image.

X-ray apparatus in which the image of an X-rayed organ or part formed on an X-ray screen is continuously reproduced on a monitor by means of a television circuit after the brightness of the image has been electro optically increased, and wherein instantaneous pictures of the X-ray image can be recorded on a photosensitive film by means of a photographic camera, is known per se. In such X-ray apparatus, during the taking of an X-ray photograph the X-ray level set for continuous X-raying is briefly increased, so that the image on the anode screen of the electrooptical image amplifier briefly obtains a brightness sufficiently high to permit exposure of a photosensitive film in a photographic camera mounted in front of the screen. The X-ray pulse formed due to the brief increase of the X-ray level should have a very short duration (in the order of some milliseconds) so as to eliminate the influence of movements of the X-rayed organ or part on the definition of the X-ray photograph.

The above known method of taking X-ray photographs entails the following drawbacks.

Firstly, when photographing the amplified X-ray image formed on the anode screen of the image amplifier it is impossible to increase or reduce the contrast in this image, as variation of the gain of the image amplifier only results in variation of the brightness of the entire image.

Furthermore, the prior apparatus has the drawback that the photographic camera should be disposed at a small distance from the anode screen of the image amplifier and, consequently, in the same space as this image amplifier, which implies that the film can be removed from the camera for developing purposes only upon completion of the entire examination and cannot be applied to an automatic developing device during this examination. This renders it impossible to check directly after the examination as to whether or not all photographs were well-taken or whether certain photographs should be taken again.

The present invention provides a method of the above type which does not include the aforesaid drawbacks, as in accordance with this method the photographic camera is employed to photograph the picture reproduced on the monitor and the gain in the television circuit is varied in accordance with a time function such that during the persistence period of the components of the image recording system, which persistence period includes a plurality of image scan cycles, the video signal applied to the monitor is maintained constant and at the same level as during continuous X-raying. The photosensitive film is exposed during a portion of this period, and this portion of the period includes a plurality of image scan cycles.

In the method according to the present invention, instead of directly employing the image anode screen of the image amplifier, the picture of the image formed by the television circuit on the screen of the monitor is used for taking the X-ray photographs. During the continuous X-raying prior to taking a photograph both the contrast and the brightness of the picture on the monitor may be adjusted to have the desired values required for a proper exposure of the photographic film so that a single exposure for each photograph to be taken suffices. The contrast control offers the important advantage that the most essential portion of the X-ray image can be photographed with optimum contrast.

By using the gain control in the television circuit, in accordance with the present invention during a photographing of the monitor picture it has further been found that a very brief increase of the X-ray level suffices for taking the photograph and prevents a lack in definition of the photograph due to movements of the patient while the subjection of the patient to an undesirably high dose of X-ray radiation is avoided. The exposure of the photographic film during a period including a plurality of image scan cycles has the additional advantage that due to the integration of the noise occurring in the image amplifier and the television circuit over the relatively long exposure time of the photographic film, as compared with the duration of the X-ray pulse, no noise-produced coarse-granularity of the X-ray photograph will occur.

The present invention further provides apparatus for performing the above method comprising the components described above wherein the photographic camera is disposed in front of the viewing screen of the monitor and the apparatus includes an electric circuit coupled to the control device of the X-ray source for controlling the gain in the television circuit such that, upon an increase of the X-ray level for taking a photograph of the monitor picture, the gain is first instantaneously reduced and subsequently increased in accordance with a time function so that the video signal applied to the monitor is maintained at a constant level during a period of time including a plurality of image scan cycles, said constant level being equal to the level of this signal during the preceding period of continuous X-raying.

In the apparatus according to the present invention both the monitor and the photographic camera may be disposed in a space separated from the examination location and accordingly, the photographic camera may be combined with a device for automatically developing the exposed film, so that the X-ray photographs taken during the examination are available to the radiologist during the examination or shortly after the completion thereof, so that if one or more of the photographs are deflective they can be immediately be retaken.

The present invention will be set forth hereinafter with reference to the associated drawing, in which.

Figure 1:
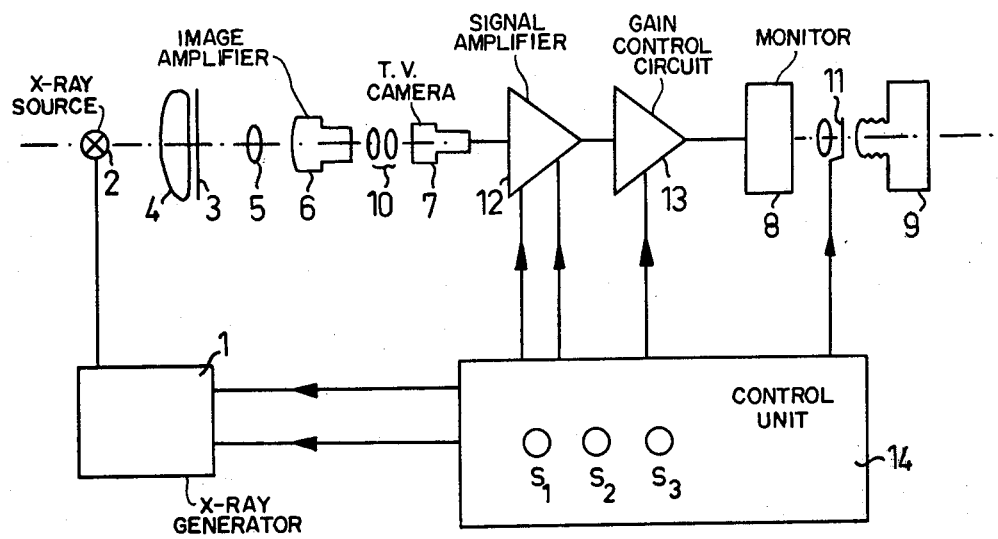
FIG. 1 is a schematic representation of X-ray examination apparatus arranged in accordance with the present invention.

The apparatus schematically shown in FIG. 1 comprises an X-ray generator 1, an X-ray source 2 connected to the X-ray generator 1 and an X-ray screen 3 for forming an X-ray image of an organ or part of the body 4 of a patient standing between the X-ray source and the X-ray screen 3, an assembly of an optical system 5 and an electric image amplifier 6 disposed behing the screen 3 for forming a picture having amplified brightness of an X-ray image on the anode screen of the image amplifier 6. Additionally, a television circuit including a camera 7 and a monitor 8 for recording and reproducing an X-ray picture having amplified brightness is provided together with a photographic camera 9 disposed in front of the viewing screen of the monitor 8 for taking instantaneous photographs of the monitor picture. A coupling optic means 10 is disposed between the anode screen of the image amplifier 6 and the camera 7, while an electrically operable shutter 11 is disposed between the viewing screen of the monitor and the photographic camera 9. The television circuit further includes a signal amplifier 12 and a circuit 13 for automatically controlling the gain in the television circuit. The apparatus further comprises a control unit 14 which may be similar to the control arrangement described in German "Offenlegungsschrift" No. 2,010,360, except for the appropriate timing of the control levels generated which occur in the manner described hereinafter in conjunction with FIGS. 2a – 2d a plurality of switching circuits associated with manually operable switches S1, S2 and S3 for switching the apparatus on and off and switching the apparatus to a continuous X-ray mode and an X-ray photograph mode. Thus, the switch $S_1$ merely acts to energize and de-energize the apparatus according to the instant invention and hence may take the conventional form of an On/Off control while switches S2 and S3 initiate the separate X-ray modes employed.

The switching circuit associated with switch S2 is arranged such that by actuating this switch the X-ray generator 1 is switched to an operative condition in which it applies a continuous X-ray signal to the X-ray source 2, which signal has a level sufficiently low to permit prolonged X-raying of a patient without harmful consequences. The switch S2 and its associated switching circuit may thus take the conventional form of the so-called X-ray switch commonly employed in conventional X-ray equipment.

The switching circuit associated with switch S3 is arranged to enable an X-ray photograph to be automatically taken in response to actuation of this switch. This is accomplished, upon actuation of the switch S3, by switching the X-ray generator 1 and the X-ray source 2 from the operative condition, in which they produce a low level X-ray signal for continuous X-raying, to an operative condition in which the generator and the source produce, subsequent to a certain delay required for the preparation of the apparatus for taking an X-ray photograph, an X-ray pulse which has a very high level relative to the continuous X-ray level but is very short in duration of an order of some milliseconds. Concurrently with the generation of this X-ray pulse, the gain of the amplifier 12 in the television circuit is instantaneously reduced to a lower value and a control circuit is actuated in this amplifier to gradually increase the gain from this lower value in accordance with a predetermined time function. At the same time in the television circuit the control signal of the automatic gain control circuit 13 is locked at a value equal to the value of this signal at the end of the preceding period of continuous X-raying.

Furthermore, a circuit for controlling the shutter 11 is actuated, which circuit is also included in the control unit 14, as a result of which the shutter is opened at a point of time preceding the occurrence of the X-ray pulse and is closed after a period of time including a plurality of image scan cycles. The switching circuit associated with the switch S3 thus may typically take the form of a conventional sequential switching or timing means which acts in response to the depression of switch S3 to generate a plurality of appropriately timed signals wherein each of said plurality of appropriately timed signals would act to enable one of the functions associated with switch S3 as outlined above and would exhibit the timing relationships set forth below in conjunction with FIGS. 2a – 2d. Such conventional switching or timing means could conveniently take the form of drum, disc or other commutating rotary switching means of the type disclosed, for instance, in U.S. Pat. No. 3,550,157, as issued to F. W. Pfleger on Dec. 22, 1970, U.S. Pat. No. 3,651,287, as issued to L. Rubenstein on Mar. 21, 1972, U.S. Pat. No. 2,938,969, as issued to J. N. Gladden et al. on May 31, 1960 or U.S. Pat. No. 2,844,948, as issued to L. A. Weiss on May 5, 1959.

The operation of the apparatus will be set forth hereinafter with reference to the timing diagrams shown in FIGS. 2a through 2d.

Figure 2A:
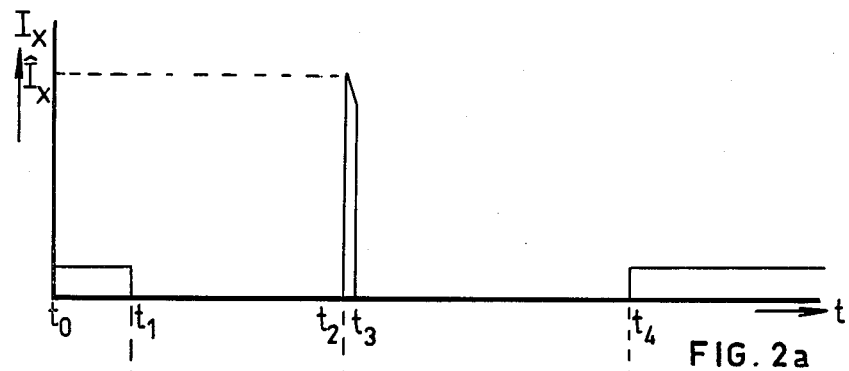
FIG. 2a through 2d show a plurality of timing diagrams illustrating the operation of the apparatus shown in FIG. 1.

FIG. 2a shows the level $I_x$ of the X-ray radiation as a function of time over a period during which continuous X-raying is interrupted for the taking of an X-ray photograph. As shown, during the period of continuous X-raying the level $I_x$ has a relatively low value from a point of time $t_o$ extending to time $t_1$. During this period the X-ray image can be viewed on the monitor and the brightness and the contrast of the monitor picture can be adjusted to have the desired values required for the subsequent taking of an X-ray photograph. As indicated in FIG. 2A when the switch S3 for taking an X-ray photograph is actuated at time $t_1$, the continuous X-ray signal is interrupted due to the resultant switching of the X-ray generator 1 and after a predetermined preparation period an X-ray pulse is produced at time $t_2$. The pulse has a large magnitude $I_x$ and a short duration ($t_3-t_2$) of some milliseconds. Due to this large X-ray pulse, an image of correspondingly high intensity is produced on the X-ray screen 3, which image remains present or persists for some time after the termination of the X-ray pulse due to the persistence of the screen. During this time the brightness of the image will decrease in a manner approaching a function exponential fashion. Thus, a persistent image whose brightness decreases accordingly is formed on the anode screen of the image amplifier 6 and this may be image is recorded by the camera 7 through the coupling optic means 10 should it be desired to obtain a photograph from this location.

Figure 2B:
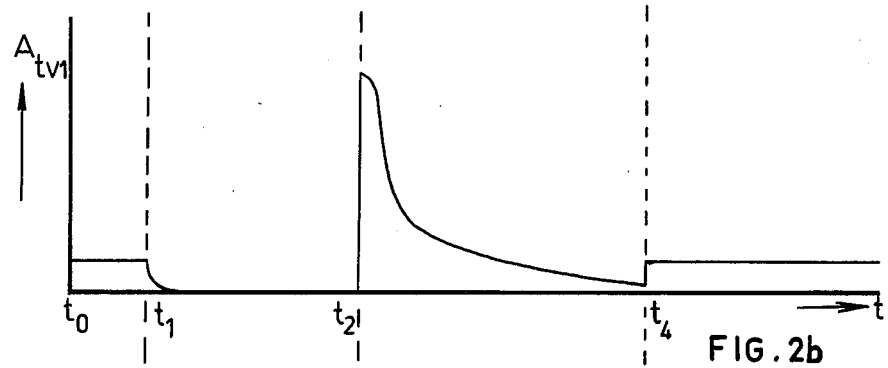

FIG. 2b shows the characteristic of the amplitude $A_{tv1}$ of a signal applied to the input of the monitor 8 in the television circuit prior to and during the taking of an X-ray photograph in the absence of a gain variation in this circuit in accordance with the teachings of the present invention. As appears in FIG. 2b, the amplitude of signal will decrease from an initial high value in response to the high level X-ray pulse at point of time $t_2$ to the value zero at time $t_4$ in substantially the same manner as the intensity of the X-ray image. At time $t_4$, the X-ray generator 1 is automatically switched to its original operating condition for continuous X-raying. Because the high level X-ray pulse has a duration of only a few milliseconds while the period of time required for reproducing an image on the screen of the monitor 8 ranges from 1/25 to 1/30 of a second for the characteristics of the input signal applied to the monitor in the manner shown in FIG. 2b, it will be appreciated that the resulting picture obtained on the viewing screen of the monitor will exhibit highly varying brightness charateristics during the latter period of the interval rendering it impossible to obtain a proper photograph.

Figure 2C:
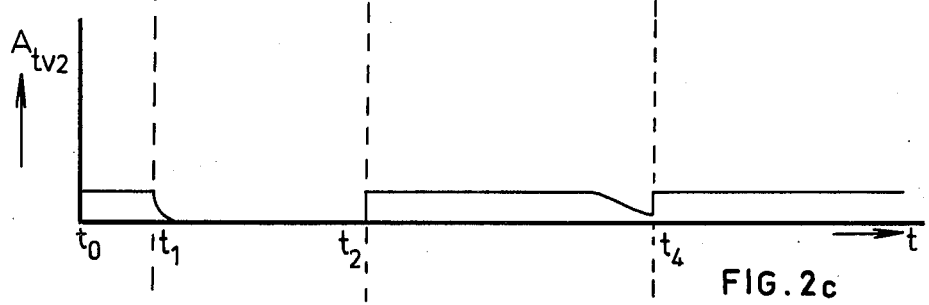
Figure 2D:
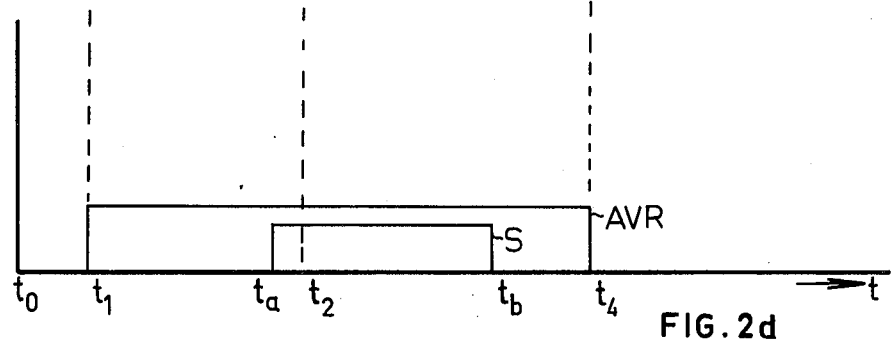

In the apparatus according to the present invention, however, the amplifier 12 in the television circuit comprises a control circuit actuated by a switching circuit in the control unit 14. The control circuit is described in detail below in conjunction with FIG. 3 while the switching circuit is associated with the switch S3 and actuates the control circuit in an appropriately timed manner. The gain of the amplifier as shown in FIG. 2c, controlled by this control circuit in such manner that at time $t_2$ as shown in FIG. 2c, the gain is considerably reduced in value relative to the value employed during a continuous X-raying interval and is increased from this point that the amplitude of the output signal of the amplifier 12 is maintained, during a period of time including a plurality of image scan cycle, at a value equal to the value of the amplitude of this signal during the preceding period of continuous X-raying. The resultant characteristic of the amplitude $A_{tv2}$ of the input signal to the monitor 8 during continuous X-raying and the taking of an X-ray photograph is shown in FIG. 2c. Due to this aspect of the instant invention in controlling the video signal produced at the monitor in response to the high level X-ray pulse so that the same exhibits constant value during a plurality of image scan cycles, a picture of constant brightness will be formed on the screen of the monitor during these image scan cycles enabling the film in the camera 9 can to be uniformly exposed. Thus during the taking of the X-ray photograph, the amplitude of the video signal will have a value equal to the value at which this signal was set during the preceding period of continuous X-raying and may be achieved by a proper selection of the latter setting so that the film is properly exposed at the outset and repetitive exposures are rendered unnecessary.

Furthermore, it is possible to use the automatic gain control circuit 13 included in the television circuit during the taking of the X-ray photograph to ensure that previously established brightness and contrast parameters are reestablished when low level or continuous X-ray operations are resumed. More particularly by locking this circuit by means of a switching circuit included in the control unit 14 and associated with switch S3, upon actuation of this switch during the taking of the X-ray photograph, the control signal produced by AGC circuit 13 is maintained at the value established during the preceding period of continuous X-raying. This situation is schematically illustrated by the curve AVR in FIG. 2d. In this figure the curve S illustrates the operation of the shutter 11. The shutter 11 is opened at time $t_a$ preceding the time $t_2$ at which the high level spoke is produced and is closed after the portion of the period which includes a plurality of image scan cycles during which the video signal applied to the monitor 8 is controlled to have a constant value. The point of time at which the shutter is closed is indicated by $t_b$. By closing the shutter 11 at point of time $t_b$ and not at point of time $t_4$ it the film in the camera 9 is exposed only during the period when the video signal applied to the monitor 8 has a constant amplitude. This exposure is thus interrupted prior to the moment when, due to the reduction of the brightness of the X-ray image to zero, the amplitude of the video signal starts decreasing and the signal-to-noise ratio thereof decreases to a value detrimentally affecting the quality of the image.

Figure 3:
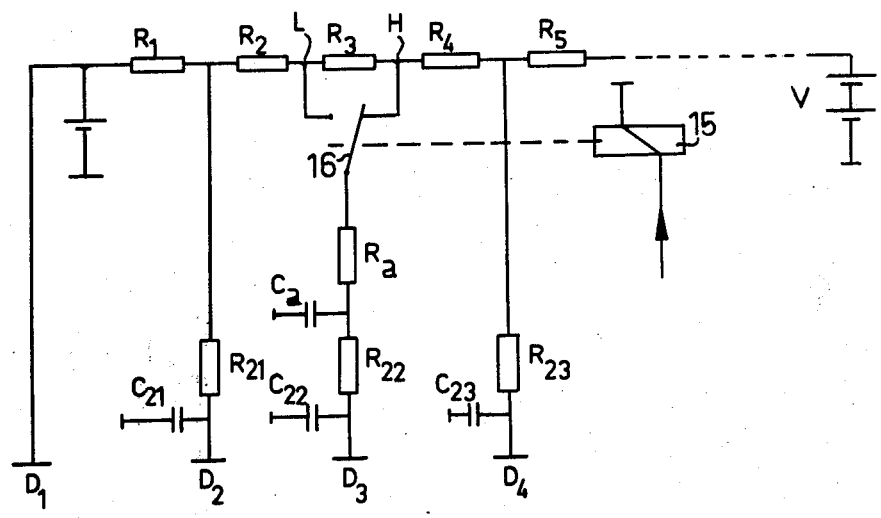
FIG. 3 is a schematic wiring diagram of a circuit for controlling the gain in a television circuit such as an image orthicon or isocon tube for use in the apparatus depicted in FIG. 1.

FIG. 3 shows a wiring diagram of a possible embodiment of a circuit for controlling the gain of amplifier 12 for the television circuit in the manner according to the present invention under conditions where the apparatus includes an image orthicon or isocon tube with a built-in signal amplifier in the form of an electron multiplier. As the arrangement of such an image orthicon or isocon tube is known per se, FIG. 3 schematically shows only a number of dynodes $D_1$, $D_2$, $D_3$ and $D_4$ associated with the electron multiplier section thereof. These dynodes are each connected, either directly or through a resistors $R_{21}$, $R_{22}$ etc., to the taps on a voltage divider composed of resistors $R_1$, $R_2$ etc. The voltage divider thus causes the dynodes to be positively biased to a voltage required for a given gain. For the purpose of decoupling the dynode voltages, each dynode is further connected, if necessary through a capacitor, to the negative terminal of the supply source V for the voltage divider. In the apparatus according to the present invention, the connection between one of the dynodes, e.g. dynode $D_3$, includes, in addition to the usual resistor $R_{22}$, resistor $R_a$ and the junction point between resistors $R_{22}$ and $R_a$ is connected through capacitor $C_a$ to the negative terminal of the supply source. The RC circuit thus formed is connected to a switching contact 16 of a switching relay 15, and through the positioning of contact 16 the bias circuit of this dynode can be switched between two taps L and H on the voltage divider. The taps L and H on the voltage divider are separated from each other by resistor $R_3$. The relay 15 is controlled by a switching circuit included in the control unit 14, which switching circuit is arranged such that upon actuation of the switch S3 of the control unit the dynode $D_3$ is connected to the tap L on the voltage divider by means of the switching contact 16 and is thus immediately biased to a reduced voltage, which will result in a reduction of the gain of the signal amplifier 12. The switching to reduce the gain implemented in the preparation period between time $t_1$ during which the X-ray generator 1 is switched to an operative condition for supplying a high level X-ray pulse, and time $t_2$ at which this X-ray pulse is generated. At time $t_2$, the contact 16 is again switched or connected through the action of the relay 15 to the tap H on the voltage divider, whereupon the voltage at applied to the reduced dynode $D_3$ and, consequently, the gain of the signal amplifier 12 may increase in accordance with a time function determined by the resistors $R_a$ and $R_{22}$ and the capacitors $C_a$ and $C_2$. By a proper dimensioning of the components of the RC circuit, the decreasing intensity of the X-ray image upon the termination of the high level pulse, and hence the decreasing video input may be compensated by increase in the gain of the signal amplifier 12 so that the relatively flat characteristic of the video signal characteristic shown in FIG. 2c may be obtained.

In the apparatus according to the present invention, the film in camera 9 is exposed only during a portion of the period during which the video signal applied to the monitor 8 has a constant value. This exposure time is considerably longer than the duration of the X-ray pulse and hence the point of time at which the shutter 11 is opened need not be in synchronism with the point of time $t_2$ at which the X-ray pulse is generated, accordingly shutter timing only requires that the shutter is opened shortly before the high level pulse is produced.

I claim:

1. A method of X-ray examination and producing selected photographic records therefrom comprising the steps of:

applying X-ray radiation generated at a first level from an X-ray source to a subject to be examined and forming an X-ray image therefrom, said first level being selected at a value to permit extended periods of continuous examination of a subject without harmful consequences;

forming an optical image corresponding to said X-ray image;

producing an amplified video signal corresponding to said optical image and applying said amplified video signal to a video monitor, said amplified video signal being obtained by applying sufficient gain to an initially produced video signal to achieve desired brightness and contrast characteristics at said video monitor;

de-energizing said X-ray source for a brief interval prior to the production of a selected photographic record and reducing the gain applied to said video signal to a predetermined low level during said brief interval prior to the production of a selected photographic record;

applying high intensity X-ray radiation generated in a short burst at a second level from said X-ray source to a subject being examined and forming X-ray and optical images therefrom, said second level being of sufficient magnitude to produce an optical image having high persistance and said low level gain established during said interval causing the amplitude of the resulting video signal during the presence of said short burst of high intensity X-ray radiation to correspond approximately to that obtained for amplified video signals resulting from X-ray radiation at said first level; and increasing the gain applied to said video signal in accordance with a predetermined function of time to cause said amplified video signal to exhibit substantially constant magnitude characteristics during said persistance of said optical image upon a termination of said short burst of high intensity X-ray radiation, 2. The method of X-ray examination and producing selected photographic records therefrom according to claim 1 additionally comprising the steps of:

disposing photographic recording means in optical communication with said video monitor;

exposing the recording medium in said photographic recording means just prior to the application of said high intensity X-ray radiation to said subject being examined; and terminating exposure of said recording media during said persistance of said optical image.

3. Apparatus for X-ray examination and producing selected photographic records therefrom comprising:

a controllable X-ray radiation source;

means for forming an X-ray image of areas being examined;

image converter means in optical communication with said X-ray imaging means for converting said X-ray image into a corresponding optical image;

means for selectively controlling said controllable X-ray radiation source, said control means active during X-ray examination operations for providing a low level energizing signal to said X-ray radiation source to permit periods of continuous examination and active in response to an initiation of a photographic operation to terminate said low level energizing signal and for subsequently applying a large magnitude energizing pulse of relatively short duration to said X-ray radiation source;

video signal generating means including means for transducing said optical image into a video signal and means for amplifying said video signal, said amplifying means including means responsive to said control means in terminating said low level energizing signal and subsequently applying said large magnitude energizing pulse to said X-ray radiation source for reducing the gain exhibited by said amplifying means and thereafter controlling the gain exhibited thereby in a timed relation to the energizing of said X-ray radiation source by said control means; and video monitor means for receiving an amplified video signal from said amplifying means and producing a video image in response thereto.

4. The apparatus according to claim 3 wherein said amplifying means includes an automatig gain control circuit, and means responsive to said control means in terminating said low level energizing signal upon an initiation of a photographic operation to maintain the condition of said automatic gain control circuit at a condition established during said X-ray examination operation until said photographic operation teminates.

5. The apparatus according to claim 1 additionally comprising photographic recording means disposed in optical communication with said video monitor means for selectively photographing a visual image displayed thereby during a photographic operation.

6. The apparatus according to claim 5 wherein said means for selectively controlling said controllable X-ray radiation source additionally comprises means for initiating exposure of a recording medium with said photographic recording means just prior to the application of said large magnitude energizing pulse to said X-ray radiation source and for terminating exposure of said recording medium at a time subsequent to the occurrence of said large magnitude energizing pulse of relatively short duration and during a period of persistance of the optical image induced thereby.

7. The apparatus according to claim 3 wherein said amplifying means includes a voltage divider network and time constant responsive circuit means for controlling the gain exhibited thereby and said means responsive includes switching means for connecting said time constant responsive circuit means to a lower level portion of said voltage divider network upon a termination of said low level energizing signal to reduce the gain exhibited by said amplifying means, said switching means additionally acting to connect said time constant responsive circuit means to a higher level portion of said voltage divider network upon the application of said large magnitude energizing pulse to said X-ray radiation source to permit the gain of said amplifying means to increase in a timed relationship to the energizing of said X-ray radiation source by said control means.

8. The apparatus according to claim 7 wherein said time constant responsive circuit means includes at least one R-C charging circuit and the state of said switching means is controlled by said means for selectively controlling said controllable X-ray radiation source.

9. The apparatus according to claim 8 wherein said video signal generating means comprises electro-optical transducer means having amplifying means in the form of an electron multiplier including a plurality of dynodes, said dynodes being connected to individual taps on said voltage divider network and at least one of said dynodes being connected through said R-C charging circuit to said lower or higher level portion of said voltage divider network depending upon the state of said switching means.

10. The apparatus according to claim 9 wherein said switching means comprises relay means for controlling the condition of contact means, said contact means being connected to said R-C charging circuit and selectively to either said higher or lower level portion of said voltage divider network depending on the state of said relay means.

\* \* \* \* \*

UNITED STATES PATENT OFFICE
CERTIFICATE OF CORRECTION

Patent No. 3,996,420      Dated December 7, 1976

Inventor(s) Ronald Jan Geluk

It is certified that error appears in the above-identified patent and that said Letters Patent are hereby corrected as shown below:

Col. 2, line 12, after "image", insert --at the--;
    line 65, delete "deflective" and insert --defective--;
    line 65, delete "be" (first occurrence).
Col. 3, line 17, delete "behing" and insert --behind--;
    line 38, after "2d" insert --.--;
    line 40, insert --The control unit 14 includes-- before "a"
Col. 4, line 35, "2,844,948" should be --2,884,948--;
    line 62, delete "a" and insert --an--, delete "function";
    line 63, delete "fashion", insert --function--;
    line 65, delete "may be", after "image" insert --may be--; delete "is";
Col. 5, line 8, delete "point of";
    line 36, insert --($t_2$) so-- after "point";
    line 38, delete "cycle" insert --cycles--;
    line 50, delete "can",
Col. 6, line 12, delete "it";
    line 32, delete "a" (first occurrence);
    line 65, insert --reduced-- before "voltage", delete "at";
    line 66, insert --reduced-- after "the";
Col. 7, line 1, delete "$C_2$" insert --$C_{22}$--;
    line 6, delete "characteristic of";
    line 7, delete "the"
    line 16, delete ", accordingly" after "generated" and insert --. Accordingly--.

UNITED STATES PATENT OFFICE
CERTIFICATE OF CORRECTION

Patent No. 3,996,420　　　　　　　　　Dated December 7, 1976

Inventor(s) Ronald Jan Geluk

It is certified that error appears in the above-identified patent and that said Letters Patent are hereby corrected as shown below:

Col. 8, line 42, "automatig" should be --automatic-- (Claim 4)
Col. 8, line 56, delete "with" and insert --within--. (Claim 6)

Signed and Sealed this

Thirteenth Day of September 1977

[SEAL]

Attest:

RUTH C. MASON　　　　　　　LUTRELLE F. PARKER
Attesting Officer　　　　　Acting Commissioner of Patents and Trademarks